(12) United States Patent
Tanaka et al.

(10) Patent No.: US 9,026,703 B2
(45) Date of Patent: May 5, 2015

(54) BUS MONITORING DEVICE, BUS MONITORING METHOD, AND PROGRAM

(75) Inventors: Yoshinobu Tanaka, Tokyo (JP); Akira Ueno, Tokyo (JP)

(73) Assignee: Olympus Corporation, Tokyo (JP)

( * ) Notice: Subject to any disclaimer, the term of this patent is extended or adjusted under 35 U.S.C. 154(b) by 416 days.

(21) Appl. No.: 13/527,752

(22) Filed: Jun. 20, 2012

(65) Prior Publication Data

US 2013/0013832 A1  Jan. 10, 2013

(30) Foreign Application Priority Data

Jul. 6, 2011  (JP) .................. 2011-150082

(51) Int. Cl.
*G06F 13/14* (2006.01)
*G06F 12/08* (2006.01)

(52) U.S. Cl.
CPC ............ *G06F 13/14* (2013.01); *G06F 12/0831* (2013.01); *G06F 12/0835* (2013.01)

(58) Field of Classification Search
CPC .......................... G06F 12/0831; G06F 12/0835
USPC .................. 710/100, 107, 305; 711/147, 148
See application file for complete search history.

(56) References Cited

U.S. PATENT DOCUMENTS

| | | | | |
|---|---|---|---|---|
| 5,771,358 | A * | 6/1998 | LaBerge ...................... | 710/107 |
| 2002/0116562 | A1* | 8/2002 | Mathuna et al. ............. | 710/105 |
| 2003/0046522 | A1* | 3/2003 | Ehmann et al. ................... | 713/1 |
| 2009/0113138 | A1* | 4/2009 | Bass et al. ..................... | 711/144 |
| 2012/0042110 | A1 | 2/2012 | Nakazono et al. | |
| 2012/0042111 | A1 | 2/2012 | Nakazono et al. | |

FOREIGN PATENT DOCUMENTS

| | | |
|---|---|---|
| JP | 2001-175532 A | 6/2001 |
| JP | 2007-241918 A | 9/2007 |
| JP | 2008-041089 A | 2/2008 |
| JP | 2009-193093 A | 8/2009 |
| JP | 2010-033496 A | 2/2010 |
| JP | 2011-003160 A | 1/2011 |
| JP | 2011-003161 A | 1/2011 |
| JP | 2012-43052 A | 3/2012 |
| JP | 2012-43053 A | 3/2012 |

OTHER PUBLICATIONS

Japanese Office Action dated Dec. 2, 2014, issued in Japanese Application No. 2011-150082; w/English translation. (8 pages).

* cited by examiner

*Primary Examiner* — Glenn A Auve

(74) *Attorney, Agent, or Firm* — Westerman, Hattori, Daniels & Adrian, LLP

(57) ABSTRACT

A bus monitoring device may include a measurement unit configured to measure a bandwidth of data on a common bus for a unit time, which is constant and predetermined, based on transfer information indicating a state of exchange of the data when a plurality of processing blocks connected to the common bus exchange the data via the common bus with a memory including an address space having a plurality of banks.

13 Claims, 13 Drawing Sheets

BUS MONITORING DEVICE, BUS MONITORING METHOD, AND PROGRAM

BACKGROUND OF THE INVENTION

1. Field of the Invention

The present invention relates to a bus monitoring device, a bus monitoring method, and a program.

Priority is claimed on Japanese Patent Application No. 2011-150082, filed Jul. 6, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In many system large-scale integrations (LSIs) mounted on image processing devices such as a still-image camera, a moving-image camera, a medical endoscope camera, and an industrial endoscope camera, a plurality of embedded processing blocks share one connected dynamic random access memory (DRAM). In the system LSIs as described above, the plurality of embedded processing blocks are connected to a data bus inside each of the system LSIs. Each processing block accesses the DRAM by means of direct memory access (DMA). At this time, a bus arbiter controls access to the DRAM while properly arbitrating a request for access to the DRAM issued from each processing block.

In this bus arbiter, the following two important functions are required. One function is to secure a bus bandwidth of the entire data bus. The other function is to properly arbitrate each processing block.

The bus bandwidth represents an amount of data on the data bus when each processing block accesses the DRAM. As a method of securing the bus bandwidth of the entire data bus, a bank interleaving method is well-known. In bank interleaving, a data transfer is controlled for each bank of the DRAM. The efficiency of data access of the DRAM is improved by performing a process of setting an address of the next bank to be accessed in parallel during a process of a data transfer of a previously accessed bank. However, there is a period in which access is not accepted when the same bank is continuously accessed in the DRAM. Thus, if the same bank is continuously accessed in bank interleaving, a loss time in which the DRAM does not accept the access occurs and therefore the efficiency of data access is degraded. To secure the high efficiency of data access by performing a data transfer process and an address setting process in parallel, it is necessary to sequentially access different banks by means of bank interleaving.

In addition, as a method of arbitrating each processing block, a method of determining priority when access from each processing block to the DRAM is performed is well-known. Priority of access to the DRAM is determined, for example, according to an average value (average bandwidth) between bus bandwidths of each processing block, a capacity of a buffer provided in each processing block, a level of importance of each processing block, or the like. A bus bandwidth necessary for each processing block is secured by preferentially allocating the bus bandwidth to a processing block in which processing fails when access to the DRAM is inhibited for a constant period of time.

In the related art, technology for improving a bus bandwidth of the entire data bus by means of bank interleaving, that is, improving the efficiency of access to data of the DRAM and securing system performance, while securing a bus bandwidth necessary for each processing block is disclosed.

In Japanese Unexamined Patent Application, First Publication No. 2011-003160 (hereinafter referred to as Patent Document 1), technology for setting priority of each processing block in a register and preferentially accepting access by a high-priority processing block to a different bank is disclosed. In addition, in Japanese Unexamined Patent Application, First Publication No. 2011-003161 (hereinafter referred to as Patent Document 2), technology for setting a method of generating a DRAM address according to each processing block in a register and generating a DRAM address so that banks separated from each other among a plurality of processing blocks are accessed is disclosed.

In the technologies disclosed in Patent Documents 1 and 2, it is possible to perform optimum arbitration for securing the system performance by performing proper register settings, for example, according to a type of DRAM, an operation mode of the system, or the like, because each setting can be adjusted in the register settings.

As described above, in the technologies disclosed in Patent Documents 1 and 2, it is possible to adjust opposite demands such as the improvement of a bus bandwidth of the entire data bus and the securement of a bus bandwidth necessary for each processing block according to the register settings.

However, in the technologies disclosed in Patent Documents 1 and 2, when the register settings are not optimum, for example, an operation of the entire system may fail when a bus bandwidth is allocated by preferentially accepting a request of DRAM access of a low-priority processing block or when bank interleaving does not effectively function, leading to the degradation of the bus bandwidth of the entire data bus.

In this case, it is necessary to specify a processing block, which is a cause of the failure of the operation of the entire system, or optimize the register settings. In addition, even when the operation of the entire system does not reach the failure, effective utilization of bank interleaving and analysis of whether or not DRAM data is efficiently accessed are important to optimize the register settings and improve the system performance.

However, there is no method of improving the efficiency of DRAM data access or acquiring information that is a guideline for optimizing register settings. Thus, in the related art, the efficiency of system development is bad, for example, because the system is actually operated after the register settings considered to be optimum are performed when register settings of processing blocks are performed, and an operation of finding settings in which the system does not fail is performed.

Although it is possible to specify a processing block that is a cause of a system failure to a certain extent from changed register settings when the system fails, it may be impossible to analyze the efficiency of data access when the system does not fail.

SUMMARY

The present invention provides a bus monitoring device, a bus monitoring method, and a program, which can enable useful information for improving the efficiency of a data bus to be acquired.

A bus monitoring device may include: a measurement unit configured to measure a bandwidth of data on a common bus for a unit time, which is constant and predetermined, based on transfer information indicating a state of exchange of the data when a plurality of processing blocks connected to the common bus exchange the data via the common bus with a memory including an address space having a plurality of banks.

The measurement unit may include: a unit time generation unit configured to generate a unit time timing signal indicating a break of the unit time based on a predetermined timing signal; a state measurement counter unit configured to measure a period in which the transfer information indicates a predetermined state in the data exchange based on the timing signal; and a result holding register unit configured to hold a result measured by the state measurement counter unit at a timing when the unit time timing signal indicates the break of the unit time.

The transfer information may be information by which a common bus arbiter, arranged outside the measurement unit, arbitrating data access requests output from the plurality of processing blocks connected to the common bus and exchanging the data with the memory indicates a state of data access from any one processing block of which the data exchange has been accepted within the plurality of processing blocks connected to the common bus to the memory.

The measurement unit may further include: a bus state determination unit configured to determine a state of data access to the memory by any one processing block of which the data exchange has been accepted within the plurality of processing blocks connected to the common bus based on a signal included in the common bus, the bus state determination unit outputting a determination result as the transfer information.

The bus state determination unit may: determine a loss time in which the data access is not accepted based on an interval of a data access acceptance signal indicating that the data access has been accepted to be output according to data access requests from the plurality of processing blocks connected to the common bus included in the common bus; determine a processing block of which the data access has been accepted based on data access request signals indicating the data access requests from the plurality of processing blocks connected to the common bus included in the common bus and the data access acceptance signal; determine a state of data access to the memory by the processing block of which the data access has been accepted based on an address signal of the memory output from the processing block of which the data access has been accepted and a control signal indicating writing of data to the memory or reading of data from the memory; determine a type of the determined loss time based on the determined data access state; and output the transfer information corresponding to the type of the determined loss time.

The transfer information may include loss amount information indicating a period of loss, in which data access is not accepted, that occurs when a bank provided in the memory is accessed in access of bank interleaving performed for the memory, and the measurement unit may measure a time of the loss or the number of losses based on the loss amount information.

The transfer information may include loss amount information indicating a period of loss, in which data access is not accepted, that occurs when the memory is switched from a read operation to a write operation or when the memory is switched from the write operation to the read operation according to data access to the memory, and the measurement unit may measure a time of the loss or the number of losses based on the loss amount information.

The transfer information may include loss amount information indicating a period of loss in which data access generated by a refresh operation performed on the memory is not accepted, and the measurement unit may measure a time of the loss or the number of losses based on the loss amount information.

The transfer information may include access amount information indicating a period of data access to the memory, and the measurement unit may measure a time of the data access or the number of data accesses based on the access amount information.

The access amount information may indicate a period of data access for each bank of the memory, and the measurement unit may measure a time of the data access for each bank of the memory or the number of data accesses based on the access amount information.

The access amount information may indicate a period of data access for each read operation and each write operation of the memory, and the measurement unit may measure a time of the data access of each read operation and each write operation of the memory or the number of data accesses based on the access amount information.

A bus monitoring method may include: a measuring step of measuring a bandwidth of data on a common bus for a constant unit time defined in advance based on transfer information indicating a state of exchange of the data when a plurality of processing blocks connected to the common bus exchange the data via the common bus with a memory including an address space having a plurality of banks.

A program device storing a program for causing a computer to execute: a measuring step of measuring a bandwidth of data on a common bus for a constant unit time defined in advance based on transfer information indicating a state of exchange of the data when a plurality of processing blocks connected to the common bus exchange the data via the common bus with a memory including an address space having a plurality of banks.

According to the present invention, it is possible to acquire useful information for improving the efficiency of a data bus.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
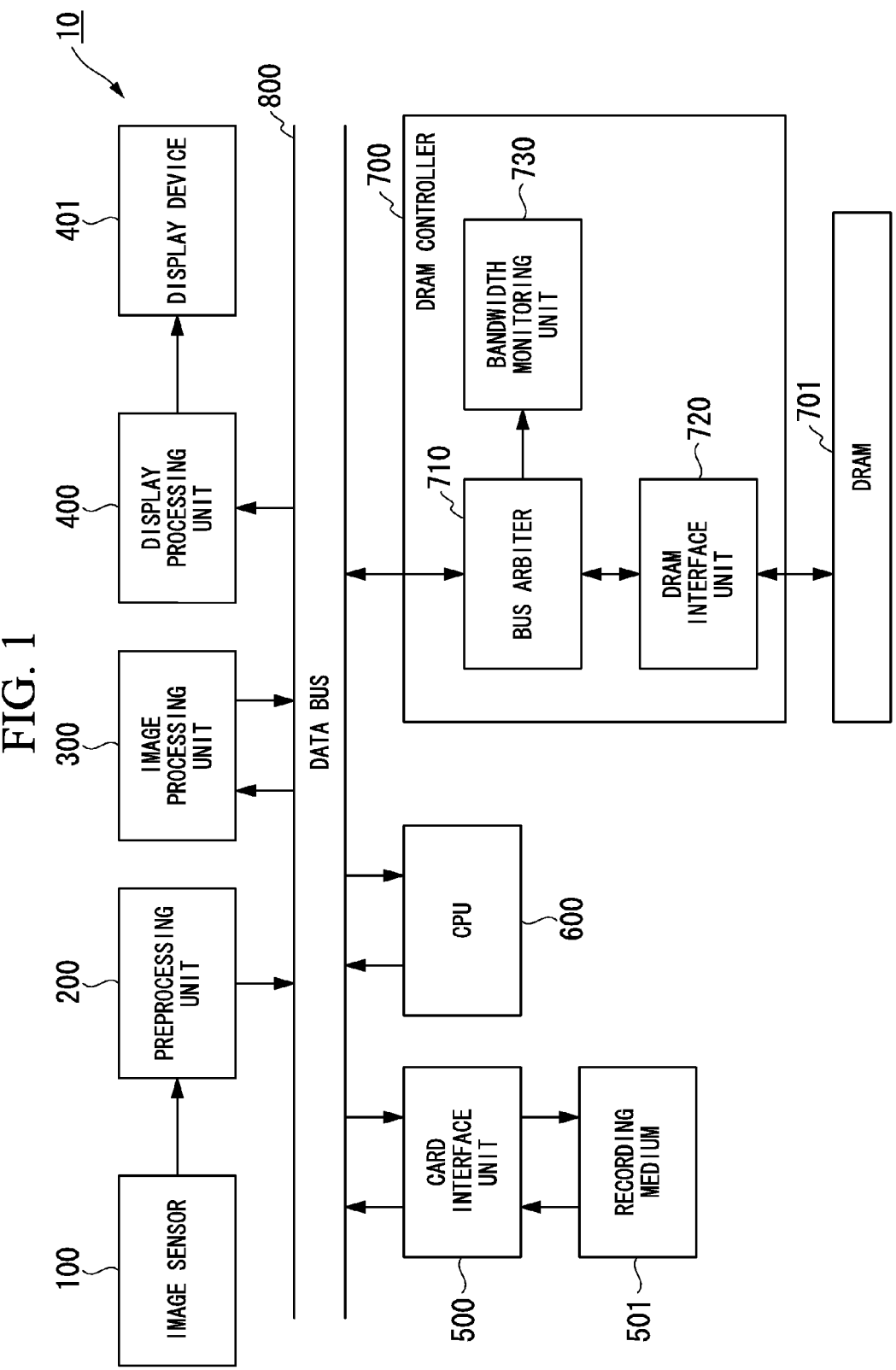
FIG. 1 is a block diagram illustrating a schematic configuration of an image processing device in accordance with a first preferred embodiment of the present invention.

FIG. 1 is a block diagram illustrating a schematic configuration of an image processing device in accordance with the first preferred embodiment of the present invention. In FIG. 1, the image processing device 10 includes an image sensor 100, a preprocessing unit 200, an image processing unit 300, a display processing unit 400, a display device 401, a card interface unit 500, a recording medium 501, a central processing unit (CPU) 600, a DRAM controller 700, and a DRAM 701. The preprocessing unit 200, the image processing unit 300, the display processing unit 400, the display device 401, the card interface unit 500, the CPU 600, and the DRAM controller 700 within the image processing device 10 are each connected via a data bus 800. By means of DMA access, data is read from the DRAM 701 connected to the DRAM controller 700 and data is written to the DRAM 701. The data bus 800 includes signals such as a DMA access request signal, a DMA access acceptance signal, a read/write control signal (RW control signal), an address, and data so that each processing block performs DMA access.

The image sensor 100 is an image sensor represented by a charge coupled device (CCD) image sensor, which photoelectrically converts an optical image of an object formed by a lens (not illustrated), or a complementary metal-oxide semiconductor (CMOS) image sensor. The image sensor 100 outputs an image signal (hereinafter referred to as "input image data") corresponding to object light to the preprocessing unit 200.

The preprocessing unit 200 is a processing block that performs preprocessing such as scratch correction or shading correction for input image data input from the image sensor 100, and transfers (writes) image data of a result of preprocessing (hereinafter referred to as "preprocessed image data") to the DRAM 701. When the preprocessed image data is transferred to the DRAM 701, the preprocessing unit 200 outputs the DMA access request signal for the DRAM 701 to the DRAM controller 700. After the DMA access request is accepted by the DRAM controller 700 and the DMA access acceptance signal is input, the preprocessing unit 200 outputs the preprocessed image data to the DRAM 701 via the DRAM controller 700.

The image processing unit 300 is a processing block that acquires (reads) the preprocessed image data stored in the DRAM 701 and generates display image data or recording image data by performing various image processing operations such as noise cancellation, YC conversion processing, resize processing, and Joint Photographic Experts Group (JPEG) compression processing. In addition, the image processing unit 300 is a processing block that transfers (writes) the generated display image data and recording image data again to the DRAM 701. When acquiring the preprocessed image data from the DRAM 701, the image processing unit 300 outputs the DMA access request signal for the DRAM 701 to the DRAM controller 700. After the DMA access request is accepted by the DRAM controller 700 and the DMA access acceptance signal is input, the image processing unit 300 reads the preprocessed image data from the DRAM 701 via the DRAM controller 700.

In addition, the image processing unit 300 outputs the DMA access request signal for the DRAM 701 to the DRAM controller 700 when the display image data and the recording image data are transferred to the DRAM 701. After the DMA access request is accepted by the DRAM controller 700 and the DMA access acceptance signal is input, the image processing unit 300 outputs the generated display image data and recording image data to the DRAM 701 via the DRAM controller 700.

The display processing unit 400 is a processing block that performs display processing such as a process of acquiring (reading) the display image data stored in the DRAM 701 and superimposing on-screen display (OSD) display data on the acquired display image data, and outputs a result of the display processing to the display device 401. When the display image data is acquired from the DRAM 701, the display processing unit 400 outputs the DMA access request signal for the DRAM 701 to the DRAM controller 700. After the DMA access request is accepted by the DRAM controller 700 and the DMA access acceptance signal is input, the display processing unit 400 reads the display image data from the DRAM 701 via the DRAM controller 700. After the display processing of the read display image data is performed, the image data subjected to the display processing is output to the display device 401.

The display device 401 is a display device such as a thin film transistor (TFT) liquid crystal display (LCD) or an organic electro luminescence (EL) display, and displays an image corresponding to the image data after the display processing output from the display processing unit 400.

The card interface unit 500 is a processing block that acquires (reads) the recording image data stored in the DRAM 701 and causes the recording medium 501 to record the acquired (read) recording image data. In addition, the card interface unit 500 is a processing block that reads the image data recorded on the recording medium 501 and transfers (writes) the read image data to the DRAM 701. When the recording image data is acquired from the DRAM 701, the card interface unit 500 outputs the DMA access request signal for the DRAM 701 to the DRAM controller 700. After the DMA access request is accepted by the DRAM controller 700 and the DMA access acceptance signal is input, the card interface unit 500 reads the recording image data from the DRAM 701 via the DRAM controller 700.

In addition, when the image data read from the recording medium 501 is transferred to the DRAM 701, the card interface unit 500 outputs the DMA access request signal for the DRAM 701 to the DRAM controller 700. After the DMA access request is accepted by the DRAM controller 700 and the DMA access acceptance signal is input, the card interface unit 500 outputs the image data read from the recording medium 501 to the DRAM 701 via the DRAM controller 700.

The recording medium 501 is a recording medium such as a memory card, and records the recording image data output from the card interface unit 500. In addition, the image data recorded by the card interface unit 500 is read. Although the recording medium 501 is also a component of the image processing device 10 in FIG. 1, the recording medium 501 is a configuration attachable to and detachable from the image processing device 10.

The CPU 600 controls the components of the image processing device 10, that is, the entire image processing device 10.

Access to the DRAM 701 is controlled by the DRAM controller 700, and the DRAM 701 stores various data in a processing process of each processing block within the image processing device 10.

According to DMA access requests from a plurality of processing blocks within the image processing device 10 connected to the data bus 800, the DRAM controller 700 transfers (writes) data to the connected DRAM 701 and acquires (reads) data from the DRAM 701. The DRAM controller 700 includes a bus arbiter 710, a DRAM interface unit 720, and a bandwidth monitoring unit 730.

According to the DMA access request signal input from each processing block connected to the data bus 800, the bus arbiter 710 arbitrates the access by each processing block to the DRAM 701 based on bank interleaving or priority of each processing block, and determines a processing block of which the DMA access request is accepted. The DMA access acceptance signal is output to the determined processing block.

Thereafter, when the determined processing block transfers data to the DRAM 701, the bus arbiter 710 outputs the RW control signal indicating that the data is written to the DRAM 701 and an address of the DRAM 701 input from the processing block or the data to be transferred to the DRAM interface unit 720. In addition, when the determined processing block acquires data from the DRAM 701, the bus arbiter 710 outputs the RW control signal indicating that the data is read from the DRAM 701 and an address of the DRAM 701 input from the processing block to the DRAM interface unit 720. Thereafter, the data input from the DRAM interface unit 720, that is, the data acquired from the DRAM 701, is output to the processing block.

In addition, the bus arbiter 710 outputs information (hereinafter referred to as "transfer information") indicating a state of access of the DRAM 701 from each processing block to the bandwidth monitoring unit 730 based on the RW control signal or the address for accessing the DRAM 701 by each processing block. Details regarding the transfer information will be described later.

The DRAM interface unit 720 writes or reads data to or from the DRAM 701 according to the RW control signal, which indicates writing or reading to or from the DRAM 701, output from the bus arbiter 710, the address, or the data, that is, DRAM access from the determined processing block.

The bandwidth monitoring unit 730 monitors the bus bandwidth of the entire data bus 800 based on the transfer information input from the bus arbiter 710. In addition, the bandwidth monitoring unit 730 holds a monitoring result of the bus bandwidth of the entire data bus 800, and outputs a holding result of the bus bandwidth, for example, according to a read request via the CPU 600. The monitoring result of the data bus 800 monitored by the bandwidth monitoring unit 730 serves as information of a guideline for improving the efficiency of data access of the DRAM 701. Details regarding a method of monitoring the bus bandwidth in the bandwidth monitoring unit 730 will be described later.

As described above, when each processing block accesses the DRAM 701, each processing block within the image processing device 10 outputs the DMA access request to the DRAM controller 700. After the DRAM controller 700 accepts the DMA access request, data is written to or read from the DRAM 701 via the data bus 800 and the DRAM controller 700.

Figure 2:
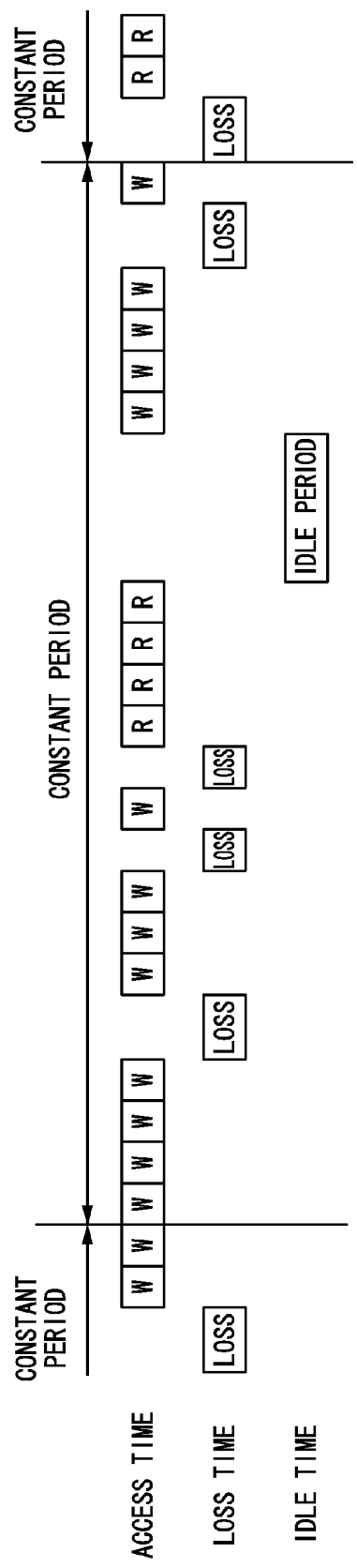
FIG. 2 is a diagram schematically illustrating an example of access to a DRAM in the image processing device in accordance with the first preferred embodiment of the present invention.

Here, an example of access to the DRAM 701 via the data bus 800 will be described with reference to FIG. 2 so as to describe the bus bandwidth of the data bus 800 monitored by the bandwidth monitoring unit 730. FIG. 2 is a diagram schematically illustrating an example of access to the DRAM 701 in the image processing device 10 in accordance with the first preferred embodiment of the present invention. In a series of processes in the image processing device 10, there are an access period in which the DRAM 701 is actually accessed via the data bus 800 and an idle period in which the DRAM 701 is not accessed as illustrated in FIG. 2.

In the series of processes in the image processing device 10, the bandwidth monitoring unit 730 monitors an execution bandwidth indicating a rate at which access is actually performed via the data bus 800 or a loss time when the DRAM 701 is accessed.

An operation in which the bandwidth monitoring unit 730 monitors the execution bandwidth of the data bus 800 is performed based on an access period in which access is performed via the data bus 800 for a unit time and an idle period in which no access is performed. More specifically, the bandwidth monitoring unit 730 monitors the execution bandwidth of the data bus 800 based on the number of accesses of the data bus 800 from each processing block or an access time.

The bandwidth monitoring unit 730 may monitor a detailed execution bandwidth of the data bus 800 based on the number of accesses or the access time of each processing block. Further, in order to monitor the execution bandwidth of the data bus 800 in detail, the bandwidth monitoring unit 730 may monitor the number of accesses and the access time for each bank of the DRAM 701 or the number of accesses and the access time of each operation of writing and reading to and from the DRAM 701.

On the other hand, the bandwidth monitoring unit 730 may monitor the idle period, thereby calculating the access time of the DRAM 701. At this time, the execution bandwidth of the data bus 800 can be more accurately calculated by considering monitoring of the loss time as will be described later.

Next, an example of a loss time in access to the DRAM 701 via the data bus 800 will be described with reference to FIGS. 3 to 6 so as to describe a bus bandwidth of the data bus 800 monitored by the bandwidth monitoring unit 730. In usual access to the DRAM, there are various loss times in a procedure when writing or reading to or from the DRAM is performed. When the DRAM 701 is accessed, the loss time becomes a factor that degrades the bus bandwidth of the data bus 800. The loss times in the access to the DRAM are as follows.

(1): Loss time caused by bank access
(2): Loss time caused by switching of an operation on the DRAM
(3): Loss time caused by a refresh operation on the DRAM The loss time caused by the bank access may occur according to an order in which the DRAM 701 is accessed when the DRAM 701 is accessed via the data bus 800.

Figure 3:
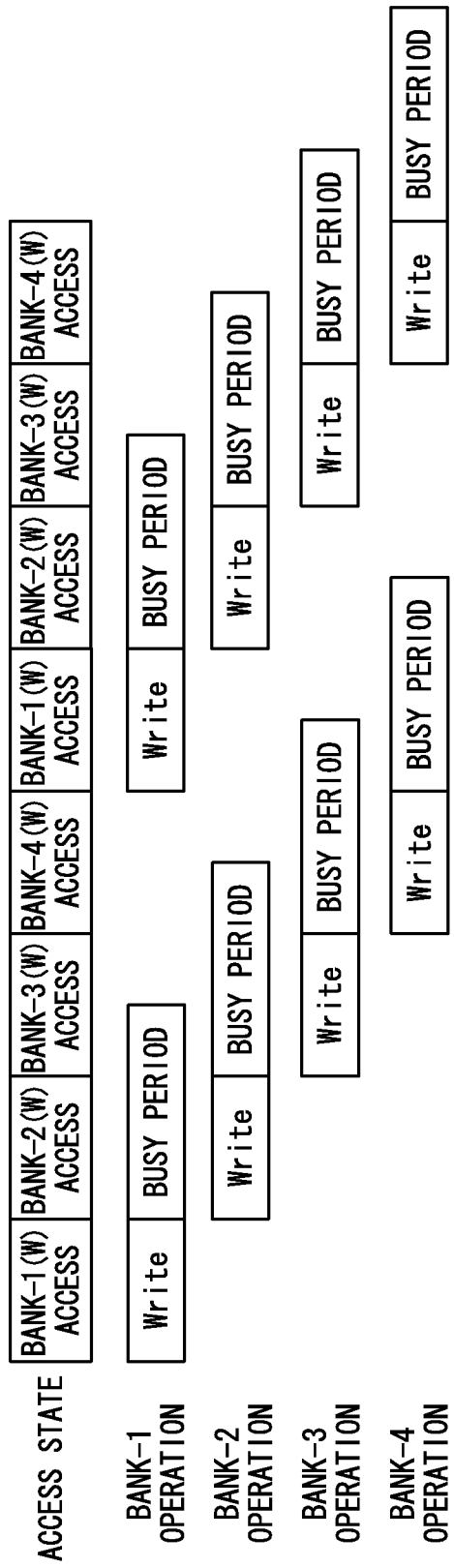
FIG. 3 is a diagram schematically illustrating an example of a loss time of a bus bandwidth caused by a bank access in the image processing device in accordance with the first preferred embodiment of the present invention.
Figure 4:
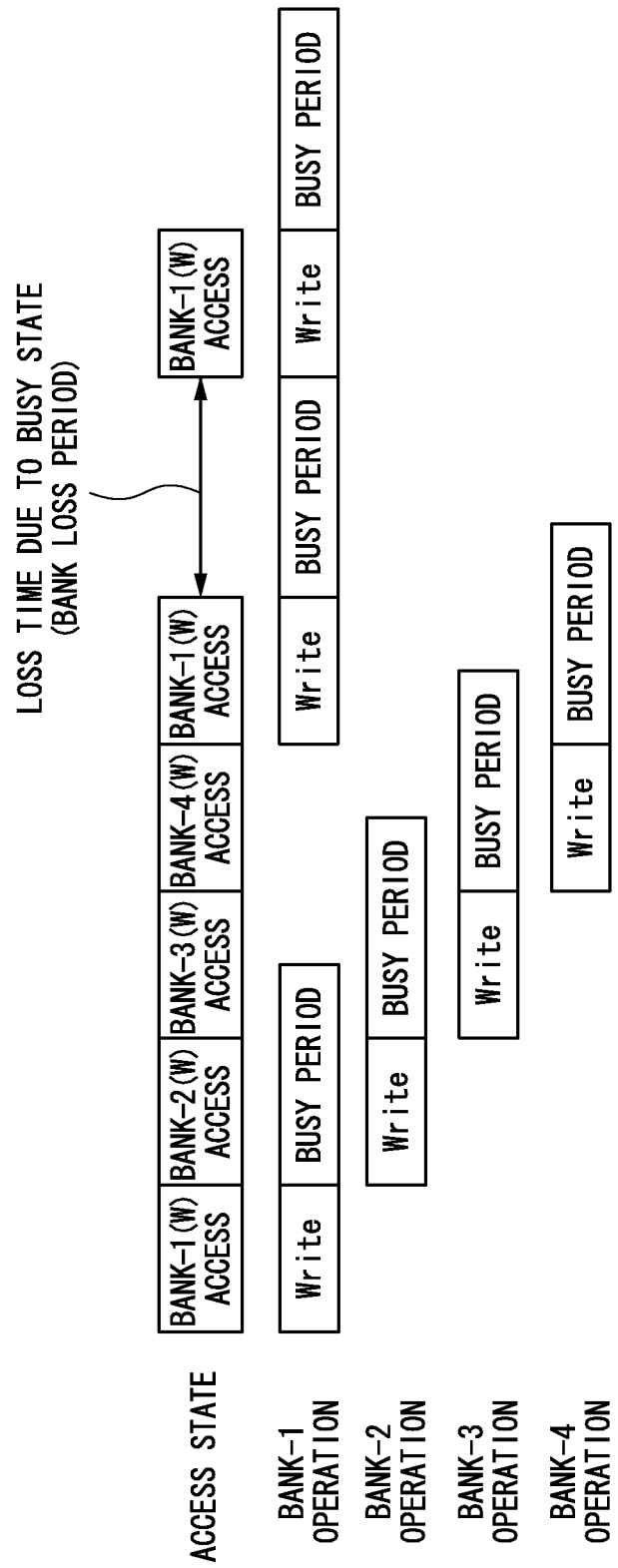
FIG. 4 is a diagram schematically illustrating another example of the loss time of the bus bandwidth caused by the bank access in the image processing device in accordance with the first preferred embodiment of the present invention.
Figure 5:
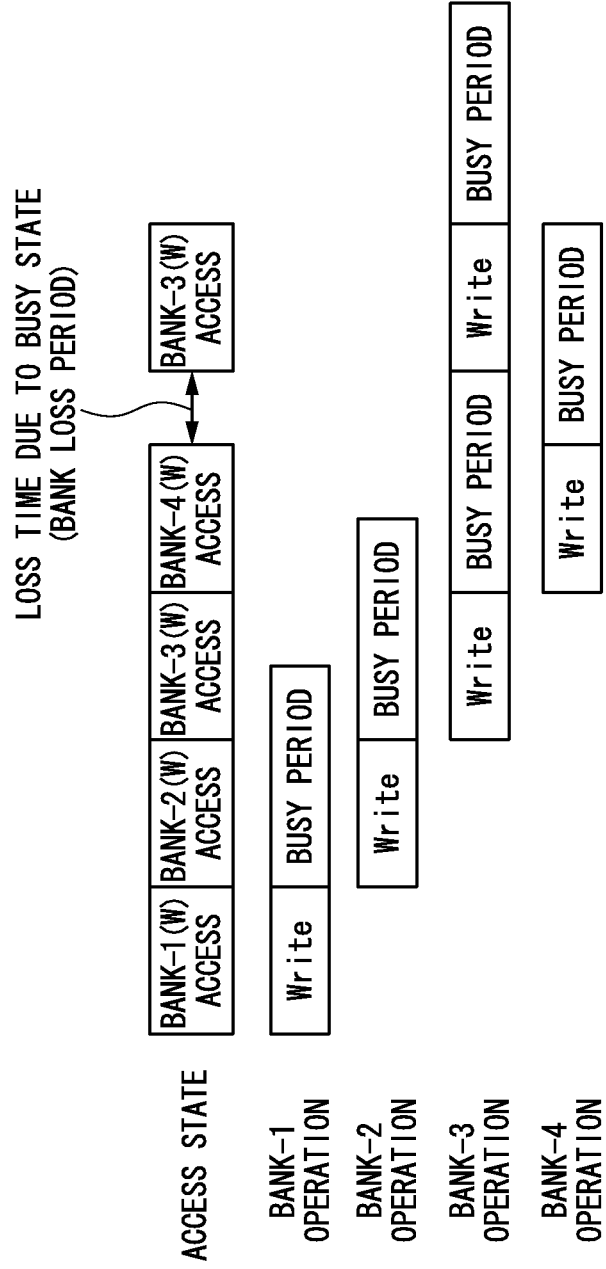
FIG. 5 is a diagram schematically illustrating another example of the loss time of the bus bandwidth caused by the bank access in the image processing device in accordance with the first preferred embodiment of the present invention.

FIGS. 3 to 5 are diagrams schematically illustrating an example of the loss time of the bus bandwidth caused by the bank access in the image processing device 10 in accordance with the first preferred embodiment of the present invention. FIG. 3 illustrates the case in which there is no loss time according to bank interleaving that effectively functions. In addition, FIG. 4 illustrates the case in which the loss time occurs according to continuous access to the same bank. In addition, FIG. 5 illustrates the case in which the loss time is caused by a period in which the access to the DRAM 701 is not accepted.

As illustrated in FIG. 3, when the bank interleaving effectively functions in operations from a bank-1 operation to a bank-4 operation, banks are sequentially accessed so that a period in which the same bank is accessed (for example, a period of bank-1 write (W) access) does not overlap a busy period in which the access to the bank is not accepted after the write operation has ended. In this case, there is no loss time in the access to the DRAM 701.

However, as illustrated in FIG. 4, when the bank-1 operation is performed again after the write operation on a bank 1 according to the bank-1 operation has ended, it may be impossible to perform a previous write operation on the bank 1 again during a busy period after the previous write operation has ended. Thus, the busy period according to the previous bank-1 operation becomes a loss period in the access of the DRAM 701. In the following description, the loss period due to the busy state is referred to as a "bank loss period."

In addition, as illustrated in FIG. 5, when the bank-3 operation is performed again across access to another bank (the bank-4 operation in FIG. 5), after the write operation on the bank 3 according to the bank-3 operation has ended, the busy period does not end after the previous write operation on the bank 3 has ended. In this case, the busy period of the previous bank-3 operation also becomes the loss period in the access of the DRAM 701 and therefore there is a bank loss period.

Figure 6:
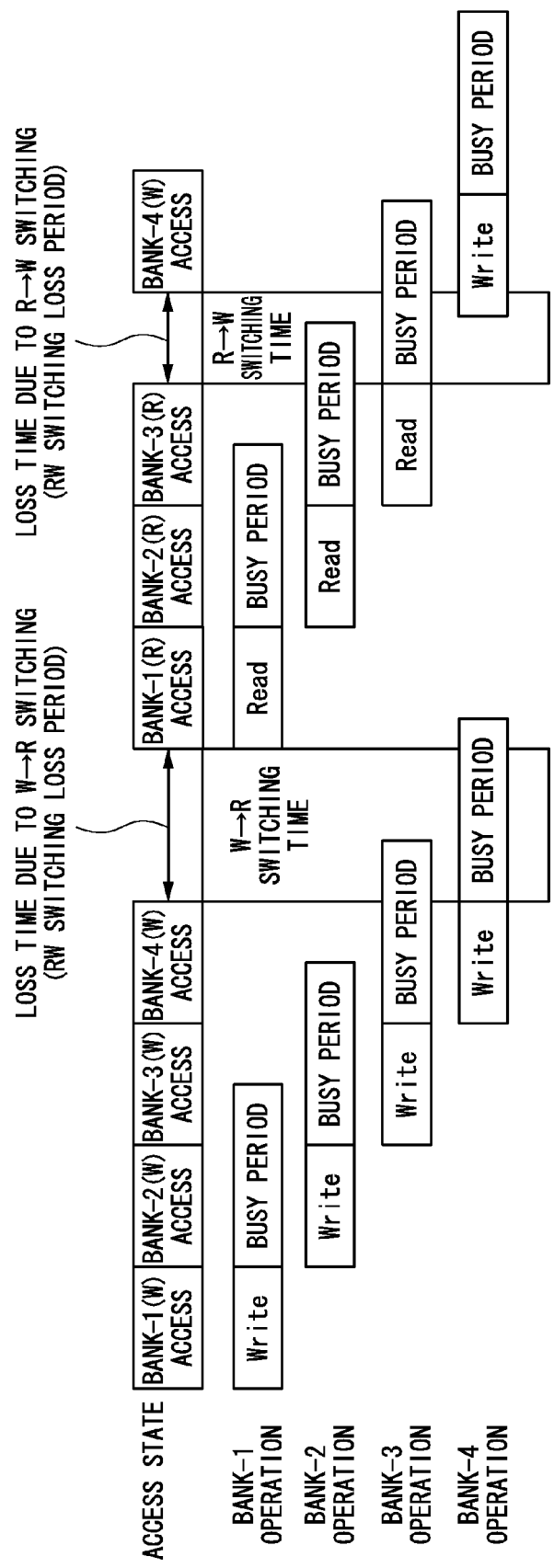
FIG. 6 is a diagram schematically illustrating an example of the loss time of the bus bandwidth due to operation switching on the DRAM in the image processing device in accordance with the first preferred embodiment of the present invention.

In addition, the loss time due to the switching of the operation on the DRAM occurs during switching from the write operation to the read operation or switching from the read operation to the write operation on the DRAM. FIG. 6 is a diagram schematically illustrating an example of the loss time of the bus bandwidth due to operation switching on the DRAM in the image processing device 10 in accordance with the first preferred embodiment of the present invention. As illustrated in FIG. 6, when switching from the write operation to the read operation or switching from the read operation to the write operation is performed on the DRAM, there is a period in which access is not accepted in association with the operation switching. A period according to the operation switching becomes the loss time in the access to the DRAM 701. In the following description, the loss period due to the operation switching is referred to as an "RW switching loss period."

In addition, the loss time caused by the refresh operation on the DRAM is associated with the refresh operation on the DRAM. Although the refresh operation is necessary when the DRAM stores data, the loss time occurs in the access to the DRAM 701 because the processing block does not access the DRAM when the refresh operation on the DRAM is performed. In the following description, the loss period due to the refresh operation on the DRAM is referred to as a "refresh period."

As described above, the loss time may occur due to an order in which the DRAM 701 is accessed when the DRAM 701 is accessed via the data bus 800. The bus arbiter 710 selects the DMA access request in which the loss time does not occur as much as possible when a processing block of which the DMA access request is accepted is determined from among processing blocks that output DMA access request signals. At this time, for example, after the bank-1 operation, the bus arbiter 710 selects the DMA access request from a processing block that accesses a bank other than the bank 1 according to the bank interleaving. In addition, the bus arbiter 710 operates to improve the bus bandwidth of the entire data bus 800, that is, the efficiency of the data access to the DRAM 701, by selecting the DMA access request of a processing block that performs the write operation after the write operation.

On the other hand, for example, when the DMA access request is input from a high-priority processing block, the bus arbiter 710 needs to give high priority to the DMA access request from the high-priority processing block, even though the efficiency of the data access of the DRAM is degraded to a certain extent, and to secure the bus bandwidth if necessary. This is because there are timings determined for an output of input image data from the image sensor 100 and an input of image data after display processing for the display device 401, for example, when input image data output by the image sensor 100 is sequentially displayed on the display device 401, in the image processing device 10.

At this time, the bus arbiter 710 operates so that the bus bandwidth necessary for each processing block is secured by selecting the DMA access request from the processing block that accesses the bank 1, for example, even after the bank-1 operation. For example, when input image data output by the image sensor 100 in the above-described image processing device 10 is sequentially displayed on the display device 401, the preprocessing unit 200 and the display processing unit 400 operate to secure necessary bus bandwidths by preferentially selecting the DMA access requests from the preprocessing unit 200 and the display processing unit 400.

The bandwidth monitoring unit 730 monitors the loss time as described above in the series of processes in the image processing device 10.

In the monitoring of the loss time caused by the bank access by the bandwidth monitoring unit 730, a total bank loss period per unit time is measured so as to indicate how much the loss time is caused by the bank access for the unit time. The bandwidth monitoring unit 730 may be configured to measure the number of bank loss periods occurring for the unit time or the number of accesses occurring during the bank loss period.

In the monitoring of the loss time caused by switching of the operation on the DRAM by the bandwidth monitoring unit 730, a total RW switching loss period per unit time is measured so as to indicate how much the loss time is caused by the switching of the operation on the DRAM for the unit time. The bandwidth monitoring unit 730 may be configured to measure the number of RW switching loss periods occurring for the unit time or the number of accesses occurring during the RW switching loss period.

In the monitoring of the loss time caused by the refresh operation on the DRAM by the bandwidth monitoring unit 730, a total refresh period per unit time is measured so as to indicate how much the loss time is caused by the refresh operation on the DRAM for the unit time. The bandwidth monitoring unit 730 may be configured to measure the number of refresh periods occurring for the unit time.

Figure 7:
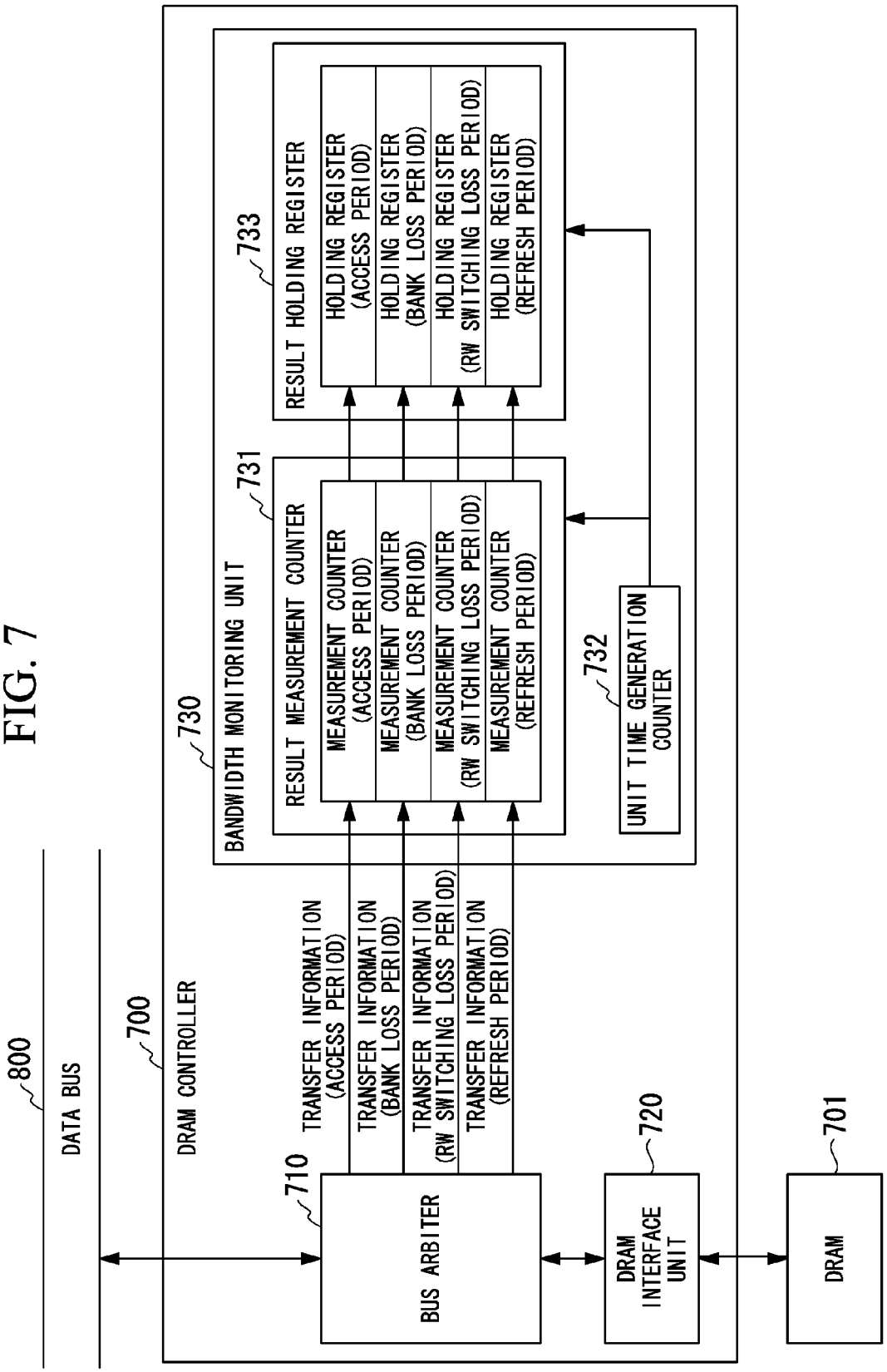
FIG. 7 is a block diagram illustrating a schematic configuration of the DRAM controller provided in the image processing device in accordance with the first preferred embodiment of the present invention.

Next, a configuration for monitoring the bus bandwidth of the data bus 800 will be described. FIG. 7 is a block diagram illustrating a schematic configuration of the DRAM controller 700 provided in the image processing device 10 in accordance with the first preferred embodiment of the present invention. In FIG. 7, only necessary connections when the bandwidth monitoring unit 730 monitors the bus bandwidth of the data bus 800 are illustrated.

According to the DMA access request signal input from each processing block connected to the data bus 800, the bus arbiter 710 arbitrates access to the DRAM 701 based on bank interleaving or priority of each processing block. Thus, the bus arbiter 710 can recognize a state of access of each processing block that accesses the DRAM 701. In addition, the bus arbiter 710 outputs an RW control signal, an address, and data of the DRAM 710 output from the processing block that accesses the DRAM 701 to the DRAM interface unit 720. Thus, the bus arbiter 710 can recognize a type of access by the processing block to the DRAM 701. The bus arbiter 710 outputs transfer information base on recognized information to the bandwidth monitoring unit 730.

FIG. 7 illustrates the case in which an access period, a bank loss period, an RW switching loss period, and a refresh period are output to the bandwidth monitoring unit 730 as transfer information. As illustrated in FIGS. 2 to 6, the access period is that in which one of the processing blocks actually accesses the DRAM 701 via the data bus 800. In addition, the bank loss period is a period of loss caused by the bank access as illustrated in FIGS. 4 and 5. In addition, the RW switching loss period is a period of loss caused by switching of the operation on the DRAM as illustrated in FIG. 6. In addition, the refresh period is a period of loss caused by the refresh operation on the DRAM 701. The bus arbiter 710 outputs a period signal indicating each period to the bandwidth monitoring unit 730 as transfer information.

The bandwidth monitoring unit 730 measures (monitors) times of the access period, the bank loss period, the RW switching loss period, and the refresh period based on period signals of the transfer information input from the bus arbiter 710. The bandwidth monitoring unit 730 includes a result measurement counter 731, a unit time generation counter 732, and a result holding register 733.

The unit time generation counter 732 generates a constant unit time for which the bandwidth monitoring unit 730 performs measurement (monitoring), for example, by performing a count operation based on a clock signal of a constant frequency. The unit time generation counter 732 outputs a signal (hereinafter referred to as a "unit time timing signal") indicating the break of the unit time to the result measurement counter 731 and the result holding register 733 every time the unit time is reached, that is, every time a given time has elapsed.

Unit time generation by the unit time generation counter 732 starts, for example, from the initiation of the operation of the image processing device 10. In addition, for example, when an operation mode of the image processing device 10 is changed, it is possible to stop the generation of the currently generated unit time and restart the generation of the unit time from the beginning. A length of the unit time generated by the unit time generation counter 732 can also be configured to be changeable, for example, according to register settings.

The result measurement counter 731 includes a measurement counter corresponding to each piece of the transfer information input from the bus arbiter 710. In the following description, each measurement counter within the result measurement counter 731 is also referred to as the "result measurement counter 731." Each result measurement counter 731 counts (counts up) a period indicated by a corresponding period signal based on a clock signal of a constant frequency identical with that of the unit time generation counter 732. A count value of each result measurement counter 731 indicates a time of the transfer information input to the bandwidth monitoring unit 730, that is, a time of each of the access period, the bank loss period, the RW switching loss period, and the refresh period. Each result measurement counter 731 outputs a count value of corresponding transfer information to the result holding register 733.

In each result measurement counter 731, the count value of the transfer information is initialized every time a unit time timing signal is input from the unit time generation counter 732, and a count operation is performed again from the beginning. Thereby, each result measurement counter 731 counts a period indicated by a period signal within the unit time.

The result holding register 733 includes a holding register corresponding to each count value input from the result measurement counter 731. In the following description, each holding register within the result holding register 733 is also referred to as the "result holding register 733." Every time a unit time timing signal is input from the unit time generation counter 732, each result holding register 733 holds a count value input from a corresponding result measurement counter 731. The count value held by each result holding register 733 indicates a time within the unit time of the transfer information input to the bandwidth monitoring unit 730, that is, a time of each of the access period, the bank loss period, the RW switching loss period, and the refresh period for the unit time. For example, according to a read request from the CPU 600, each result holding register 733 outputs the held count value to the outside.

Although an example in which one holding register corresponding to each piece of the transfer information is provided within the result holding register 733 is illustrated in FIG. 7, a configuration of the holding register provided within the result holding register 733 is not limited to only the configuration illustrated in FIG. 7. For example, three holding registers, that is, three sets, corresponding to each piece of the transfer information can be provided and count values of three previous unit times can be configured to be held. In addition, for example, when a count value of a fourth unit time is held in this configuration, the count values of the three latest unit times can be held by overwriting the count value of the fourth unit time to the holding register holding the first count value.

Figure 8:
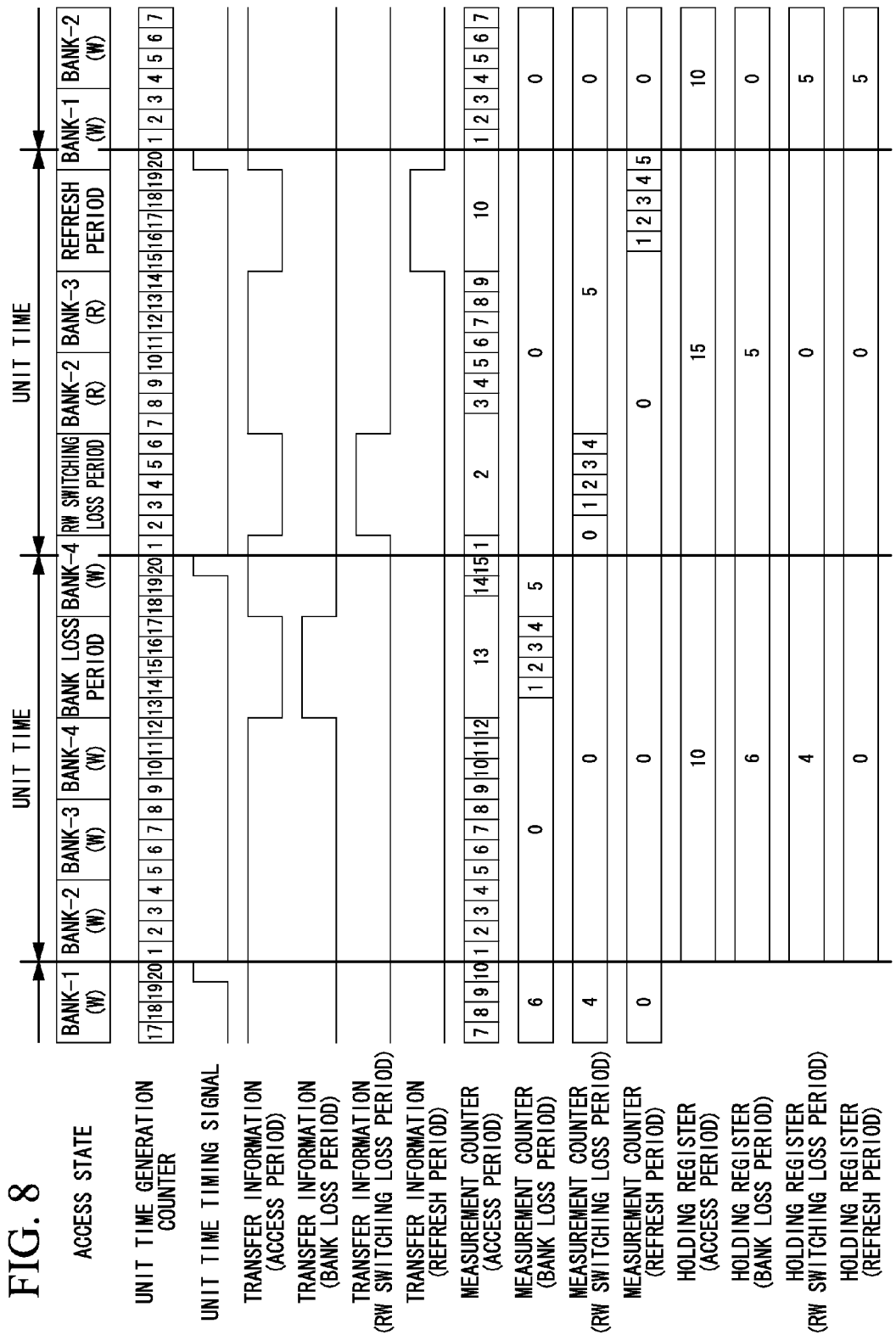
FIG. 8 is a timing chart illustrating an example of timings at which the bandwidth monitoring unit provided in the image processing device in accordance with the first preferred embodiment of the present invention monitors the loss time of the bus bandwidth of the data bus.

Next, an operation of monitoring the bus bandwidth of the data bus 800 will be described. FIG. 8 is a timing chart illustrating an example of timings at which the bandwidth monitoring unit 730 provided in the image processing device 10 in accordance with the first preferred embodiment of the present invention monitors the loss time of the bus bandwidth of the data bus 800. In FIG. 8, when an interval of a unit time timing signal generated by the unit time generation counter 732, that is, a unit time, is 20 clocks, each piece of the transfer information input from the bus arbiter 710 and operations of the result measurement counter 731 and the result holding register 733 operable in correspondence with each piece of the transfer information are shown during a period of two unit times. In FIG. 8, a period of a "High" level in each piece of the transfer information is described as the access period, the bank loss period, the RW switching loss period, and the refresh period.

The unit time generation counter 732 performs a count-up operation based on a clock signal of a constant frequency, and outputs a unit time timing signal having the "High" level every time the count value becomes "20." The count value of the unit time generation counter 732 is initialized by the unit time timing signal of the "High" level, so that the unit time timing signal has a "Low" level at the timing of the next clock signal. A period of 20 clocks becomes a unit time in which the bandwidth monitoring unit 730 performs monitoring.

The result measurement counter 731 counts a period in which a period signal of corresponding transfer information has the "High" level based on the same clock signal as that of the unit time generation counter 732. The count value of the result measurement counter 731 is initialized by the unit time timing signal of the "High" level, so that a count operation is performed again from the beginning at the timing of the next clock signal.

As illustrated in FIG. 8, the result measurement counter 731 corresponding to the access period counts to "15" in a first unit time and counts to "10" in a second unit time. In addition, as illustrated, the result measurement counter 731 corresponding to the bank loss period counts to "5" in the first unit time and the count value is "0" in the second unit time. In addition, as illustrated, the result measurement counter 731 corresponding to the RW switching loss period has a count value of "0" in the first unit time, and counts to "5" in the second unit time. In addition, as illustrated, the result measurement counter 731 corresponding to the refresh period has a count value of "0" in the first unit time, and counts to "5" in the second unit time.

The result holding register 733 holds the count value of the result measurement counter 731 when the unit time timing signal has the "High" level. That is, for one unit time, the result measurement counter 731 holds the count value counted by the result measurement counter 731 during a previous unit time.

As illustrated in FIG. 8, the result holding register 733 corresponding to the access period holds a count value "10" of a previous unit time for the first unit time, holds a count value "15" of the first unit time for the second unit time, and holds a count value "10" of the second unit time for the next unit time. In addition, as illustrated, the result holding register 733 corresponding to the bank loss period holds a count value "6" of a previous unit time for the first unit time, holds a count value "5" of the first unit time for the second unit time, and holds a count value "0" of the second unit time for the next unit time. In addition, as illustrated, the result holding register 733 corresponding to the RW switching loss period holds a count value "4" of a previous unit time for the first unit time, holds a count value "0" of the first unit time for the second unit time, and holds a count value "5" of the second unit time for the next unit time. In addition, as illustrated, the result holding register 733 corresponding to the refresh period holds a count value "0" of a previous unit time for the first unit time, holds a count value "0" of the first unit time for the second unit time, and holds a count value "5" of the second unit time for the next unit time.

As described above, the bandwidth monitoring unit 730 counts and holds each period indicated by transfer information input from the bus arbiter 710 for each unit time. A count value held by the bandwidth monitoring unit 730 serves as information of a guideline for improving the efficiency of data access when each processing block connected to the data bus 800 accesses the DRAM 701. Each count value held in the result holding register 733 within the bandwidth monitoring unit 730 is output to the outside, for example, via the CPU 600, so that a developer of the image processing device 10 can acquire the count value.

Although an example in which the unit time is 20 clocks is illustrated in FIG. 8, a longer unit time actually becomes necessary to acquire useful information for improving the efficiency of data access. In this case, for example, a necessary unit time is set in a register, which sets a length of the unit time, provided in the unit time generation counter 732, so that a count value in a unit time having a necessary length can be obtained.

Here, some examples when a method of utilizing information of an access period, a bank loss period, an RW switching loss period, and a refresh period per unit time obtained by the acquired count value, that is, a monitoring result of the data bus 800, is applied to bank interleaving of the bus arbiter 710 or setting of priority of each processing block will be described.

(Case 1)

When a total loss time per unit time monitored by the bandwidth monitoring unit 730 is large, that is, when a sum of count values corresponding to the access period, the bank loss period, the RW switching loss period, and the refresh period is large, setting of priority of each processing block is likely to be different. For example, this may be caused because the bus arbiter 710 preferentially secures a bus bandwidth of a processing block of which priority is unnecessarily high even though the efficiency of the total bus bandwidth of the data bus 800, that is, the data access of the DRAM 701, is degraded, when priority of the processing block is unnecessarily high. In this case, for example, the improvement of the total loss time can be expected by reviewing priority of each processing block and setting an appropriate priority.

(Case 2)

When a sum of count values corresponding to the bank loss period is particularly large within the loss period per unit time monitored by the bandwidth monitoring unit 730, a method of generating an address of the DRAM 701 of a high-priority processing block is likely to be inefficient. For example, this may be caused because a high-priority processing block continuously accesses the same bank as in Bank 1→Bank 1→Bank 1→ . . . , and therefore the number of busy periods of the DRAM 701 is increased (see FIG. 4). In this case, for example, by making a change to an address generation method for an address of a high-priority processing block so that banks are sequentially accessed as in Bank 1→Bank 2→Bank 3→ . . . , bank interleaving can effectively function and the improvement of the total loss time can be expected (see FIG. 3). In this case, when there are a plurality of high-priority processing blocks, the address generation method may be adjusted among a plurality of processing blocks so that access to different banks is preferentially accepted.

(Case 3)

When a sum of count values corresponding to the RW switching loss period is particularly large within the loss time per unit time monitored by the bandwidth monitoring unit 730, the operation of the high-priority processing block on the DRAM 701 is likely to be frequently switched. For example, this may be caused because the high-priority processing block alternately performs the write operation and the read operation as in Write Operation→Read Operation→Write Operation→ . . . (see FIG. 6). In this case, for example, by changing the order of operation for switching of the operation of the high-priority processing block on the DRAM 701 so that the same operation is continuously performed as in Write Operation→Write Operation→ . . . Read Operation→Read Operation→ . . . , the number of times of switching of the operation on the DRAM 701 can be reduced and the improvement of the total loss time can be expected. In this case, when there are a plurality of high-priority processing blocks, the operation on the DRAM 701 may be adjusted among the plurality of processing blocks so that the write operation or the read operation is continuous.

(Case 4)

When a sum of the total loss period per unit time monitored by the bandwidth monitoring unit 730 and the access period per unit time is small, that is, when a sum of count values corresponding to the access period, the bank loss period, the RW switching loss period, and the refresh period is small, the number of processing blocks having access to the DRAM 701 may be small or the number of accesses of each processing block may be small. In this case, the total bus bandwidth of the data bus 800 can be considered not to be problematic. However, when there is a bias in the magnitude of the sum in a series of processes such as that a sum only for a specific unit time is small and a sum for another unit time is large, the total process of the image processing device 10 is likely to be optimized in the time-axis direction by decreasing the number of processes performed in a unit time in which the sum is large and increasing the number of processes performed in a unit time in which the sum is small. As described above, it is possible to expect the improvement of suppression of the bus bandwidth of the data bus 800 in a specific time of a series of processes by optimizing a process of the time axis direction.

(Case 5)

If there is a bias in the number of accesses to each bank when the bandwidth monitoring unit 730 monitors the number of accesses to each bank of the DRAM 701 for each unit time, the balance of the address of the DRAM 701 generated by each processing block is likely to be bad. For example, when the number of accesses to the bank 1 is large, but the number of accesses to the bank 2 is small, the loss time in access to the bank 1 may be large and the total loss time may be increased. That is, when there are a bank for which the number of accesses is extremely large and a bank for which the number of accesses is extremely small, there is a problem in that bank interleaving does not effectively function. In this case, by optimizing access to each bank of the DRAM 701 such as decreasing the number of accesses to the bank for which the number of accesses is large and increasing the number of accesses to the bank for which the number of accesses is small, bank interleaving can effectively function and the improvement of a total loss time can be expected.

Second Preferred Embodiment

Figure 9:
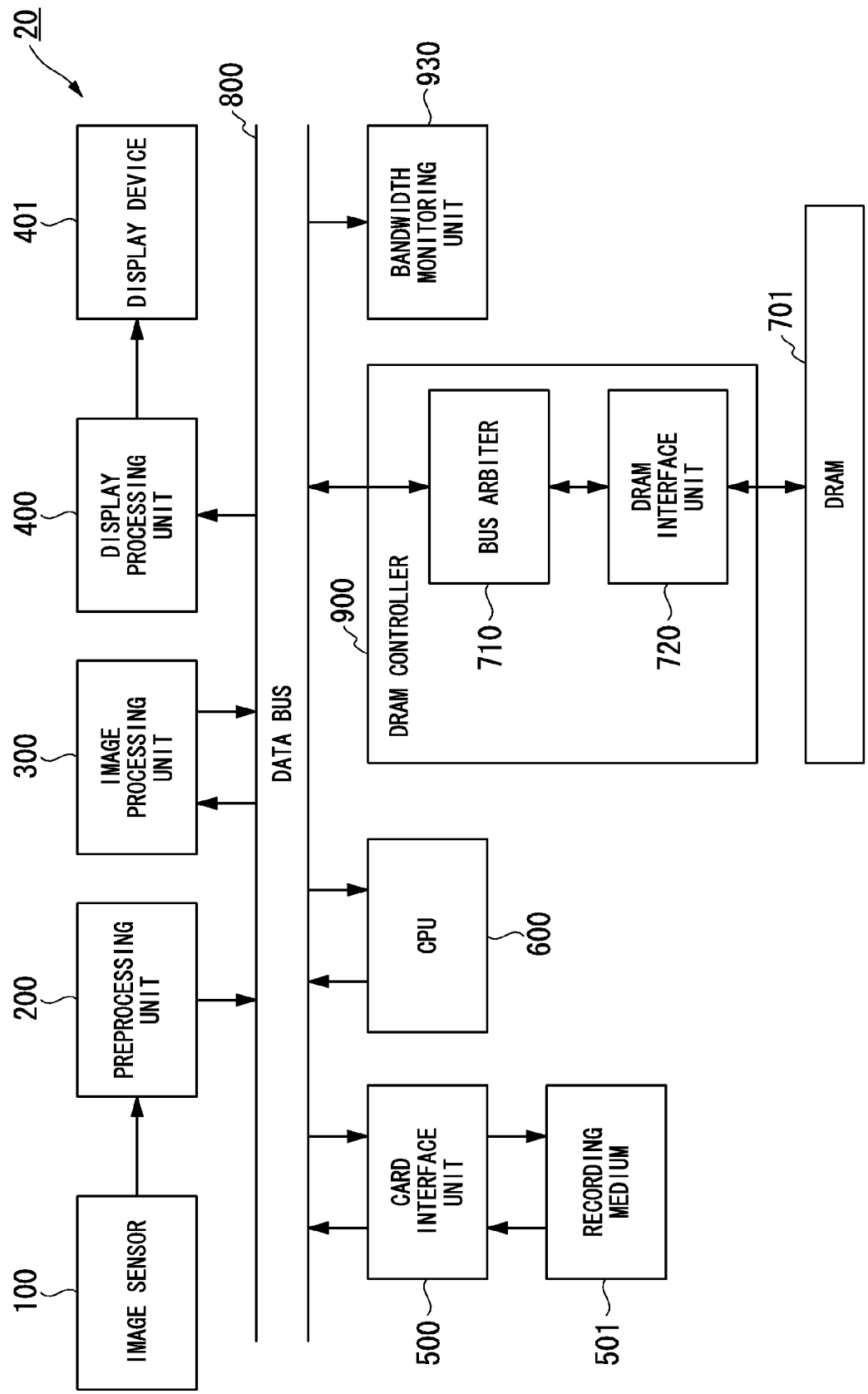
FIG. 9 is a block diagram illustrating a schematic configuration of the image processing device in accordance with a second preferred embodiment of the present invention.

Next, an image processing device in accordance with the second preferred embodiment of the present invention will be described. FIG. 9 is a block diagram illustrating a schematic configuration of the image processing device in accordance with the second preferred embodiment of the present invention. In FIG. 9, the image processing device 20 includes an image sensor 100, a preprocessing unit 200, an image processing unit 300, a display processing unit 400, a display device 401, a card interface unit 500, a recording medium 501, a CPU 600, a DRAM controller 900, a DRAM 701, and a bandwidth monitoring unit 930.

The image processing device 20 illustrated in FIG. 9 has a configuration in which the DRAM controller 900 is provided instead of the DRAM controller 700 within the image processing device 10 in accordance with the first preferred embodiment illustrated in FIG. 1 and only the bandwidth monitoring unit 930 is further connected to the data bus 800. Other components are the same as those of the image processing device 10. Accordingly, the same components as those of the image processing device 10 in accordance with the first preferred embodiment illustrated in FIG. 1 are denoted by the same reference numerals in the components of the image processing device 20 in accordance with the second preferred embodiment of the present invention, and a detailed description thereof is omitted here.

Like the DRAM controller 700 illustrated in FIG. 1, the DRAM controller 900 transfers (writes) data to the connected DRAM 701, and acquires (reads) data from the DRAM 701, according to DMA access requests from a plurality of processing blocks within the image processing device 20 connected to the data bus 800. The DRAM controller 900 includes a bus arbiter 710 and a DRAM interface unit 720. The bus arbiter 710 and the DRAM interface unit 720 are the same as the bus arbiter 710 and the DRAM interface unit 720 within the DRAM controller 700 illustrated in FIG. 1. However, the bus arbiter 710 does not output transfer information.

Like the bandwidth monitoring unit 730 within the DRAM controller 700 illustrated in FIG. 1, the bandwidth monitoring unit 930 monitors a bus bandwidth of the entire data bus 800. However, the bandwidth monitoring unit 930 monitors the bus bandwidth based on information of the connected data bus 800. As in the image processing device 10 illustrated in FIG. 1, the data bus 800 includes signals such as a DMA access request signal, a DMA access acceptance signal, a read/write control signal (RW control signal), an address, and data so that each processing block performs DMA access.

Like the bandwidth monitoring unit 730 illustrated in FIG. 1, the bandwidth monitoring unit 930 holds a monitoring result of the bus bandwidth of the entire data bus 800, and outputs a holding result of the bus bandwidth, for example, according to a read request via the CPU 600. The monitoring result of the data bus 800 monitored by the bandwidth monitoring unit 930 becomes information of a guideline for improving the efficiency of data access to the DRAM 701. Details regarding a configuration of the bandwidth monitoring unit 930 and a method of monitoring the bus bandwidth will be described later.

Here, differences between the bandwidth monitoring unit 930 and the bandwidth monitoring unit 730 illustrated in FIG. 1 will be described. Because the bandwidth monitoring unit 730 is configured to be provided within the DRAM controller 700 in the image processing device 10 illustrated in FIG. 1, the bandwidth monitoring unit 730 can monitor the bus bandwidth of the entire data bus 800 based on transfer information input from the bus arbiter 710 within the same DRAM controller 700. However, for example, when a system LSI including the preprocessing unit 200, the image processing unit 300, the display processing unit 400, the card interface unit 500, the CPU 600, and the DRAM controller 900 within the image processing device 20 is developed, a general-purpose IP module or the like already on the market is used as the DRAM controller 900. In this case, it is difficult to change the IP module of the provided DRAM controller in order to acquire transfer information from the bus arbiter 710 within the DRAM controller 900. Originally, internal information of the IP module may not be published.

As seen from the configuration illustrated in FIG. 9, the bandwidth monitoring unit 930 is connected to the data bus 800 outside the DRAM controller 900 in the image processing device 20. Thus, it is possible to monitor the bus bandwidth of the entire data bus 800 based on signals included in the data bus 800 without changing the bus arbiter 710 within the DRAM controller 900 in the image processing device 20.

In addition, a protocol of the data bus may be defined as a general-purpose protocol such as an advanced extensible interface (AXI) or an open core protocol (OCP). The bandwidth monitoring unit 930 monitors the bus bandwidth according to the protocol of the data bus 800.

As described above, the present invention is applicable to monitoring of bandwidths of data buses of various systems as well as the image processing device 20 by mounting a mechanism for monitoring the bus bandwidth according to the protocol of the data bus on the bandwidth monitoring unit 930. For example, the present invention can also be easily applied to simulator tools when a system LSI is developed.

Figure 10:
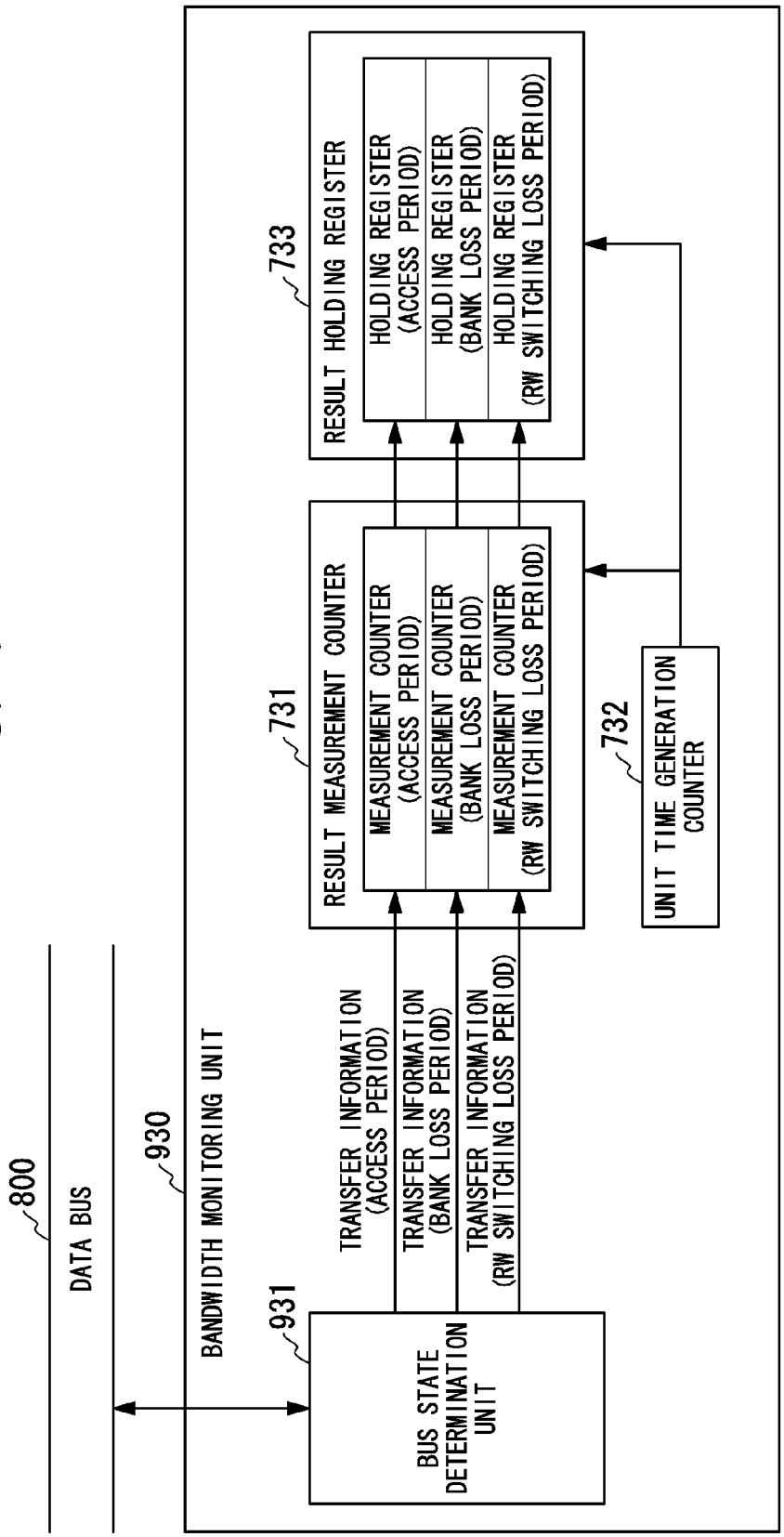
FIG. 10 is a block diagram illustrating a schematic configuration of the bandwidth monitoring unit provided in the image processing device in accordance with the second preferred embodiment of the present invention.

Next, a configuration of the bandwidth monitoring unit 930 will be described. FIG. 10 is a block diagram illustrating a schematic configuration of the bandwidth monitoring unit 930 provided in the image processing device 20 in accordance with the second preferred embodiment of the present invention. The bandwidth monitoring unit 930 includes a bus state determination unit 931, a result measurement counter 731, a unit time generation counter 732, and a result holding register 733. The bandwidth monitoring unit 930 is a configuration in which the bus state determination unit 931 is further provided in the bandwidth monitoring unit 730 illustrated in FIG. 7. Because the other components are the same as those of the bandwidth monitoring unit 730, the same reference numerals are assigned thereto and a detailed description thereof is omitted here.

The bus state determination unit 931 monitors signals included in the data bus 800 and determines (infers) access to the DRAM 701 by each processing block connected to the data bus 800 based on the monitored signals. More specifically, the bus state determination unit 931 determines whether a DMA access request of any processing block has been accepted based on a DMA access request signal output from each processing block connected to the data bus 800 and a DMA access acceptance signal output from the bus arbiter 710 within the DRAM controller 900.

In addition, the bus state determination unit 931 determines a type of access to the DRAM 701 based on an RW control signal or an address for accessing the DRAM 701 output from a processing block of which a DMA access request has been accepted. The access type is information indicating any bank of the DRAM 701 accessed by the processing block or any access of writing or reading of data.

In addition, the bus state determination unit 931 outputs transfer information based on the determined access type to the result measurement counter 731. The transfer information output by the bus state determination unit 931 is the same as the transfer information output by the bus arbiter 710 to the bandwidth monitoring unit 730 in the first preferred embodiment.

As in the bandwidth monitoring unit 730 of the first preferred embodiment, the result measurement counter 731, the unit time generation counter 732, and the result holding register 733 count and hold periods such as an access period, a bank loss period, and an RW switching loss period of the data bus 800 for each unit time based on transfer information input from the bus state determination unit 931.

Figure 11:
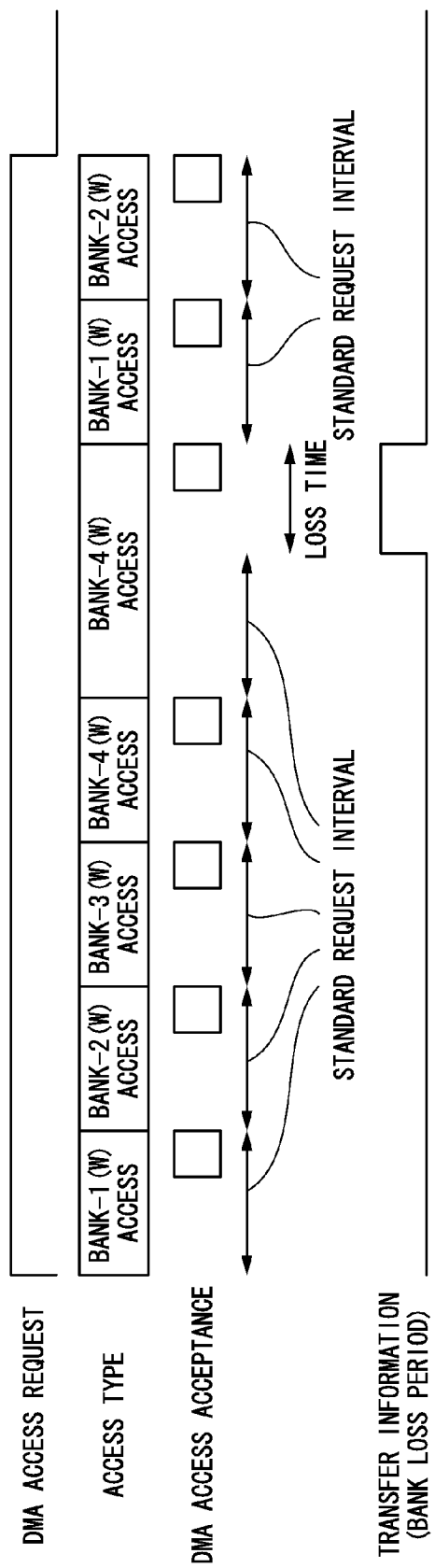
FIG. 11 is a diagram schematically illustrating an example in which the loss time of the bus bandwidth of the data bus is determined by the bus state determination unit within the bandwidth monitoring unit provided in the image processing device in accordance with the second preferred embodiment of the present invention.
Figure 12:
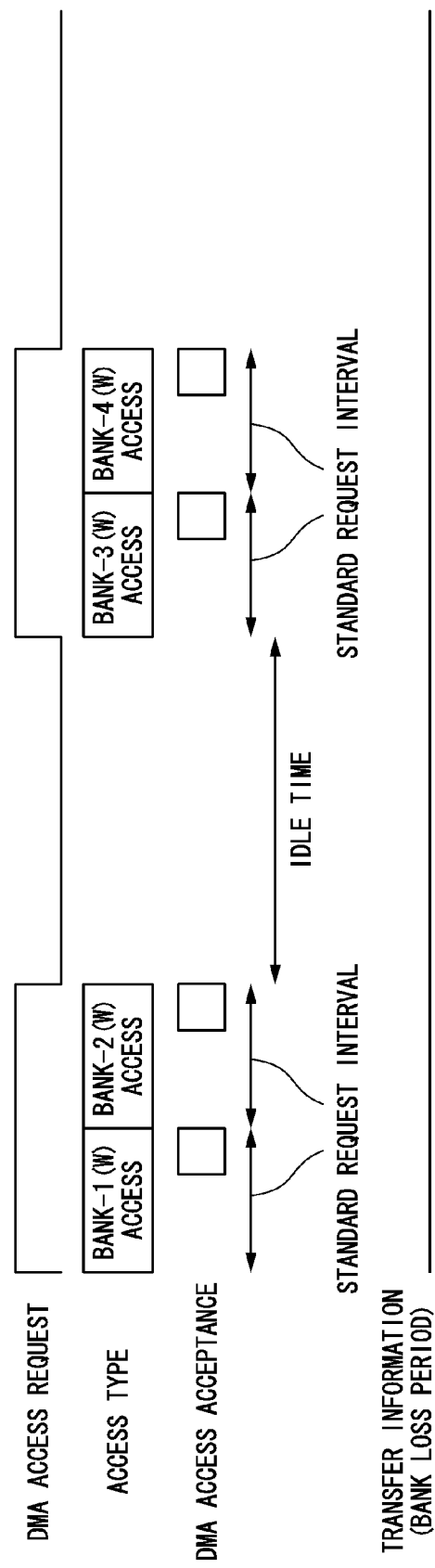
FIG. 12 is a diagram schematically illustrating an example in which an idle period of each processing block is determined by the bus state determination unit within the bandwidth monitoring unit provided in the image processing device in accordance with the second preferred embodiment of the present invention.
Figure 13:
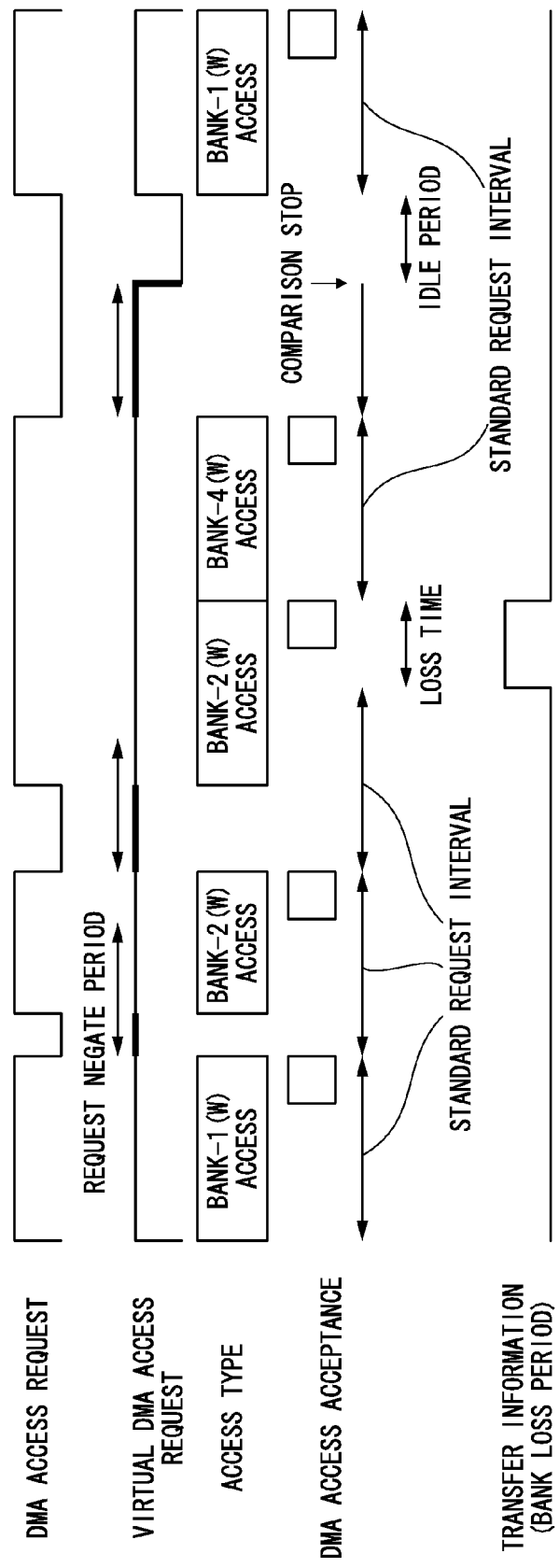
FIG. 13 is a diagram schematically illustrating another example when the loss time of the bus bandwidth of the data bus is determined by the bus state determination unit within the bandwidth monitoring unit provided in the image processing device in accordance with the second preferred embodiment of the present invention.

Here, an example of access by each processing block to the DRAM 701 will be described with reference to FIGS. 11 to 13 so as to describe a method in which the bus state determination unit 931 outputs transfer information. In FIGS. 11 to 13, a DMA access request is made when each DMA access request signal has the "High" level output from each processing block, and all DMA access request signals are integrated into one signal and expressed (by a logical OR operation). That is, the DMA access request indicates that a DMA access request signal is output from one of the processing blocks connected to the data bus 800. In addition, likewise, DMA access acceptances and access types are also integrated and expressed. That is, the DMA access acceptance indicates that the data access request of one of the processing blocks connected to the data bus 800 has been accepted, and the access type is a type of access by the accepted processing block to the DRAM 701.

FIG. 11 is a diagram schematically illustrating an example in which the loss time of the bus bandwidth of the data bus 800 is determined by the bus state determination unit 931 within the bandwidth monitoring unit 930 provided in the image processing device 20 in accordance with the second preferred embodiment of the present invention. Usually, when the DRAM 701 is accessed without loss time, the DMA access is accepted at a constant interval. The bus state determination unit 931 determines the loss time based on an interval at which the DMA access has been accepted.

First, the bus state determination unit 931 measures an interval between first DMA access acceptance and second DMA access acceptance. Here, the measured interval is assumed to be a DMA access acceptance interval (hereinafter referred to as a "standard request acceptance interval") when there is no loss time. Thereafter, like an interval between the second DMA access acceptance and third DMA access acceptance, intervals at which DMA accesses have been accepted are sequentially measured. When a current DMA access acceptance interval is longer than the standard request acceptance interval, the bus state determination unit 931 determines a period exceeding the standard request acceptance interval as a loss time. As illustrated in FIG. 11, the loss time is determined to be present during fifth access (access type=write (W) access of the bank 4).

The bus state determination unit 931 checks which bank of the DRAM 701 is accessed in a previous access type and a current access type. Thereby, it is possible to specify a cause of the loss time. Transfer information corresponding to the specified cause of the loss time is output. As illustrated in FIG. 11, transfer information indicating a bank loss time is output because the loss time is caused by bank-1 write (W) access performed again after bank-1 write (W) access has ended.

FIG. 12 is a diagram schematically illustrating an example in which an idle period of each processing block is determined by the bus state determination unit 931 within the bandwidth monitoring unit 930 provided in the image processing device 20 in accordance with the second preferred embodiment of the present invention. When a DMA access request signal is output from one of the processing blocks connected to the data bus 800, the bus state determination unit 931 sequentially measures DMA access acceptance intervals. When no DMA access request signal is output from any processing block connected to the data bus 800, the bus state determination unit 931 determines its period as the idle period and outputs no transfer information. As illustrated in FIG. 12, a period from second access (access type=write (W) access of the bank 2) to third access (access type=write (W) access of the bank 3) is determined to be the idle period.

However, even when no DMA access request signal is output from any processing block connected to the data bus 800, the DRAM 701 can be accessed at a highest speed when its period is short. For example, if the next DMA access request signal is output within one cycle in which DMA access acceptance is performed, the DRAM 701 may be accessed without loss time. The bus state determination unit 931 presets a period in which the DRAM 701 can be accessed without loss time as a period in which a state is invalid in which there is no DMA access request (hereinafter referred to as a "request negate period"). If the DMA access request signal is output from one of the processing blocks within the request negate period, the determination of the idle period is ignored.

FIG. 13 is a diagram schematically illustrating another example when the loss time of the bus bandwidth of the data bus is determined by the bus state determination unit 931 within the bandwidth monitoring unit 930 provided in the image processing device 20 in accordance with the second preferred embodiment of the present invention. As illustrated in FIG. 13, a virtual DMA access request is generated inside the bus state determination unit 931 by setting the request negate period, and the DMA access request can be processed to be virtually continuous even when an actual DMA access request signal has the "Low" level. As illustrated in FIG. 13, a state in which first and second DMA requests are absent when a period within one cycle of the standard request interval is set to the request negate period is invalid.

Thereby, in FIG. 13, accesses from first access (access type=write (W) access of the bank 1) to fourth access (access type=write (W) access of the bank 4) are processed to be continuously requested. Thereby, as illustrated in FIG. 13, the loss time is determined to be present during third access (access type=write (W) access of the bank 2). In addition, as in a state in which a third DMA access request is absent as illustrated in FIG. 13, when a period in which no DMA access request signal is output from any processing block is longer than the request negate period, the idle period is determined by performing a process in which a virtual DMA access request is also absent.

As described above, the bus state determination unit 931 determines a loss time according to the presence/absence of the DMA access request and the DMA access acceptance interval. A type of loss time is specified by a previous access type and a current access type. Thereby, the bus state determination unit 931 may output the same information as transfer information output by the bus arbiter 710 to the bandwidth monitoring unit 730 in the first preferred embodiment.

Although the case in which transfer information indicating the bank loss time is output has been described in the above-described example, transfer information indicating the access period or the RW switching loss period may also be output according to the same determination. More specifically, a period other than the idle period is output as transfer information indicating the access period. In addition, in terms of the loss time determined according to the DMA access acceptance interval, transfer information indicating the RW switching loss period is output when bank-2 read (R) access is determined to be a cause of the loss time, for example, after bank-1 write (W) access has ended.

Although the standard request interval is a constant interval in all accesses to the DRAM 701 in the above-described example, an actual request interval may differ according to a type of access to the DRAM 701. In this case, it is possible to apply a configuration in which the standard request interval is variable and make a configuration for determining the loss time based on the standard request interval according to an access type. For example, access (four-transfer access) to the DRAM 701 from which four data are transferred (written or read) in one transfer unit (one burst) and access (eight-transfer access) to the DRAM 701 from which eight data are transferred in one transfer unit may be included together. In this case, when a DMA access request of four-transfer access is accepted and when a DMA access request of eight-transfer access is accepted, the standard request interval is changed according to the number of data to be transferred in one transfer unit because a time until the next DMA access is accepted is different.

In addition, according to the previous access type and the current access type, a period in which the DRAM 701 can be accessed without loss time may differ, that is, a DMA access acceptance interval at which the DRAM 701 can be accessed at a highest speed may differ. For example, a DMA access acceptance interval at which the DRAM 701 can be accessed at a highest speed may be different at the time of Write (W) Access→Read (R) Access, the time of Read (R) Access→Write (W) Access, the time of Write (W) Access→Write (W) Access, and the time of Read (R) Access→Read (R) Access. In this case, it is possible to apply a configuration in which the request negate period is variable and make a configuration for switching a period in which the determination of the idle period is neglected according to the previous access type and the current access type.

In the block diagram of the bandwidth monitoring unit 930 illustrated in FIG. 10, a configuration regarding transfer information indicating a refresh period output by the bus arbiter 710 in the first preferred embodiment is not disclosed. This is because the refresh operation on the DRAM is not shown in the data bus. Thus, a loss time due to the refresh operation on the DRAM 701 is determined to be the bank loss period or the RW switching loss period by the bus state determination unit 931. However, when the bus state determination unit 931 determines a cause of the loss time, the loss time determined to be the bank loss period or the RW switching loss period may be sorted into the refresh period by checking which bank of the DRAM 701 is accessed in a type of access previous to previous access, for example, in addition to a previous access type and a current access type.

More specifically, when access previous to previous access is bank-1 write (W) access, the previous access is bank-2 write (W) access, and current access is bank-3 write (W) access, the loss time during the current access to the DRAM 701 can be determined to be the refresh period. When the access previous to the previous access is the bank-1 write (W) access, the previous access is the bank-2 write (W) access, and the current access is the bank-2 write (W) access, the loss time during the current access to the DRAM 701 is determined to be the bank loss period. In addition, when the access previous to the previous access is the bank-1 write (W) access, the previous access is the bank-2 write (W) access, and the current access is the bank-3 read (R) access, the loss time during the current access to the DRAM 701 is determined to be the RW switching loss period.

According to the preferred embodiment of the present invention as described above, it is possible to measure the bus bandwidth of the entire data bus by monitoring an access period or a loss period of DRAM access per unit time. The developer of the image processing device can acquire a measurement result of the bus bandwidth as information of a guideline for improving the efficiency of data access to the DRAM in the image processing device. That is, the developer of the image processing device can recognize an access state inside the image processing device such as how frequently the DRAM is currently accessed or which DRAM access currently causes a loss time. Thereby, the developer of the image processing device can change priority of each processing block set in the bus arbiter provided in the image processing device, a method in which each processing block generates an address, an order of operations of writing and reading to and from the DRAM to be performed by each processing block, and the like according to optimum settings, and can improve the efficiency of the system development of the image processing device.

In the first preferred embodiment, the bus arbiter 710 within the DRAM controller 700 is configured to output transfer information indicating an internal state and the bandwidth monitoring unit 730 is configured to count the loss period based on input transfer information for each unit time. In addition, in the second preferred embodiment, the bus state determination unit 931 within the bandwidth monitoring unit 930 is configured to output transfer information determining access to the DRAM 701 by monitoring each signal included in the connected data bus 800. The configuration of the second preferred embodiment is shown to be appropriate when it is difficult to change a bus arbiter included in the IP module such as when a general-purpose IP module is used, or when information of the bus arbiter is not published. In addition, the case in which the DRAM controller 700 or the bandwidth monitoring unit 930 is applied to the image processing device is shown.

However, a configuration for monitoring the bus bandwidth of the data bus such as the DRAM controller 700 or the bandwidth monitoring unit 930 shown in the preferred embodiment of the present invention is not limited to an application method shown in the preferred embodiment of the present invention. For example, the present invention can also be applied to a bus analysis program or the like to measure a bandwidth state of a data bus with a development tool such as a simulator of the system LSI or an emulator for virtually implementing the system LSI or the image processing device.

Various processes described above according to the DRAM controller 700 illustrated in FIG. 7 or the bandwidth monitoring unit 930 illustrated in FIG. 10 may be performed by recording a program for implementing the processes by the DRAM controller 700 or the bandwidth monitoring unit 930 on a computer-readable recording medium and causing a computer system to read and execute the program recorded on the recording medium. The "computer system" may include an operating system (OS) and/or hardware such as peripheral devices. The "computer system" includes a homepage providing environment (or displaying environment) if the World Wide Web (WWW) system is used. The "computer readable recording medium" refers to a storage device including a flexible disk, a magneto-optical disc, a read only memory (ROM), a writable nonvolatile memory such as a flash memory, a portable medium such as a compact disc-ROM (CD-ROM), and a hard disk embedded in the computer system.

Furthermore, the "computer readable recording medium" may also include a medium that holds a program for a constant period of time such as a volatile memory (for example, a DRAM) in a computer system serving as a server or client when the program is transmitted via a network such as the Internet or a communication line such as a telephone line. In addition, the above-described program may be transmitted from a computer system in which this program has been stored in a storage device and the like to another computer via a transmission medium or transmitted by carrier waves in the transmission medium. Here, the "transmission medium" for transmitting a program refers to a medium that functions to transmit information as in a network (communication network) such as the Internet and a communication line (communication link) such as a telephone line. The above-described program may implement some of the above-described functions. The above-described program may be a differential file (differential program) capable of implementing the above-described function in combination with a program already recorded on the computer system.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A bus monitoring device configured to measure a transfer loss of data on a common bus for a constant unit time defined in advance, based on transfer information indicating a state of exchange of the data when a plurality of processing blocks connected to the common bus exchange the data via the common bus with a memory including an address space having a plurality of banks, the bus monitoring device comprising:

a data access acceptance signal generation unit configured to output a data access acceptance signal indicating that a data access signal has been accepted, the data access signal being output in accordance with requests of data access from the plurality of processing blocks;

a virtual access signal generation unit configured to output a virtual access signal depending on a state of the data access; and a bus state determination unit configured to determine the transfer loss of the data on the common bus and output a determined result of the transfer loss as the transfer information, wherein the bus state determination unit compares a signal interval of the data access acceptance signal output from the data access acceptance signal generation unit with a predetermined standard request time in accordance with the virtual access signal, and determines whether the transfer loss of the data exists or not.

2. The bus monitoring device according to claim 1, wherein the virtual access signal generation unit makes the virtual access signal active in accordance with an access request signal from the plurality of processing blocks, and the virtual access signal generation unit makes the virtual access signal inactive if the access request signal has not been output for a first predetermined time or more.

3. The bus monitoring device according to claim 2, wherein the bus state determination unit:

determines a time of the transfer loss in which the data access is not accepted when the bus state determination unit determines that the transfer loss exists;

determines a processing block of which the data access has been accepted based on data access request signals and the data access acceptance signal;

determines a state of data access to the memory by the processing block of which the data access has been accepted based on an address signal of the memory output from the processing block of which the data access has been accepted and a control signal indicating writing of data to the memory or reading of data from the memory;

determines a type of the determined time of the transfer loss based on the determined state of the data access; and outputs the transfer information corresponding to the type of the determined time of the transfer loss.

4. The bus monitoring device according to claim 1, wherein, when the virtual access signal is active, the bus state determination unit compares the signal interval of the data access acceptance signal output from the data access acceptance signal generation unit with the predetermined standard request time and determines that the transfer loss of the data exists if a compared result by the bus state determination unit indicates that the signal interval of the data access acceptance signal is longer than the predetermined standard request time, and when the virtual access signal is inactive, the bus state determination unit determines that the transfer loss of the data does not exist without comparing the signal interval of the data access acceptance signal with the predetermined standard request time.

5. The bus monitoring device according to claim 4, wherein:
the transfer information includes loss amount information indicating a period of the transfer loss, in which data access is not accepted, that occurs when a bank provided in the memory is accessed in access of bank interleaving performed for the memory, and
the bus state determination unit measures a time of the transfer loss or a number of the transfer losses based on the loss amount information.

6. The bus monitoring device according to claim 4, wherein:
the transfer information includes loss amount information indicating a period of loss, in which data access is not accepted, that occurs when the memory is switched from a read operation to a write operation or when the memory is switched from the write operation to the read operation according to data access to the memory, and
the bus state determination unit measures a time of the transfer loss or a number of the transfer losses based on the loss amount information.

7. The bus monitoring device according to claim 4, wherein:
the transfer information includes loss amount information indicating a period of loss in which data access generated by a refresh operation performed on the memory is not accepted, and
the bus state determination unit measures a time of the transfer loss or a number of the transfer losses based on the loss amount information.

8. The bus monitoring device according to claim 4, wherein:
the transfer information includes access amount information indicating a period of data access to the memory, and
the bus state determination unit measures a time of the data access or a number of the data accesses based on the access amount information.

9. The bus monitoring device according to claim 8, wherein:
the access amount information indicates a period of data access for each bank of the memory, and
the bus state determination unit measures a time of the data access for each bank of the memory or a number of the data accesses based on the access amount information.

10. The bus monitoring device according to claim 8, wherein:
the access amount information indicates a period of data access for each read operation and each write operation of the memory, and
the bus state determination unit measures a time of the data access of each read operation and each write operation of the memory or a number of the data accesses based on the access amount information.

11. The bus monitoring device according to claim 1, further comprising:
a unit time generation unit configured to generate a unit time timing signal indicating the unit time based on a predetermined timing signal;
a state measurement counter unit configured to measure a period of the transfer loss of the data in the exchange of the data indicated by the transfer information, based on the timing signal; and
a result holding register unit configured to hold a result measured by the state measurement counter unit at a timing when the unit time timing signal indicates the unit time.

12. A bus monitoring method
for a bus monitoring device configured to measure a transfer loss of data on a common bus for a constant unit time defined in advance based on transfer information indicating a state of exchange of the data when a plurality of processing blocks connected to the common bus exchange the data via the common bus with a memory including an address space having a plurality of banks, the bus monitoring method comprising:
a data access acceptance signal generation step of outputting a data access acceptance signal indicating that a data access signal has been accepted, the data access signal being output in accordance with requests of data access from the plurality of processing blocks;
a virtual access signal generation step of outputting a virtual access signal depending on a state of the data access; and
a bus state determination step of determining the transfer loss of the data on the common bus and outputting a determined result of the transfer loss as the transfer information, wherein
the bus state determination step includes comparing a signal interval of the data access acceptance signal output in the data access acceptance signal generation step with a predetermined standard request time in accordance with the virtual access signal, and determining whether the transfer loss of the data exists or not.

13. A non-transitory computer-readable medium storing a computer program for causing a computer
provided in a bus monitoring device, which is configured to measure a transfer loss of data on a common bus for a constant unit time defined in advance based on transfer information indicating a state of exchange of the data when a plurality of processing blocks connected to the common bus exchange the data via the common bus with a memory including an address space having a plurality of banks, to execute:
a data access acceptance signal generation step of outputting a data access acceptance signal indicating that a data access signal has been accepted, the data access signal being output in accordance with requests of data access from the plurality of processing blocks;
a virtual access signal generation step of outputting a virtual access signal depending on a state of the data access; and
a bus state determination step of determining the transfer loss of the data on the common bus and outputting a determined result of the transfer loss as the transfer information, wherein
the bus state determination step includes comparing a signal interval of the data access acceptance signal output in the data access acceptance signal generation step with a predetermined standard request time in accordance with the virtual access signal, and determining whether the transfer loss of the data exists or not.

* * * * *